US008510550B2

(12) United States Patent
Westhoff et al.

(10) Patent No.: US 8,510,550 B2
(45) Date of Patent: Aug. 13, 2013

(54) METHOD FOR MANAGING DATA IN A WIRELESS SENSOR NETWORK

(75) Inventors: Dirk Westhoff, Heidelberg (DE); Joao Girao, Heidelberg (DE); Einar Mykletun, Heidelberg (DE)

(73) Assignee: NEC Corporation, Tokyo (JP)

( * ) Notice: Subject to any disclaimer, the term of this patent is extended or adjusted under 35 U.S.C. 154(b) by 2151 days.

(21) Appl. No.: 11/474,451

(22) Filed: Jun. 26, 2006

(65) Prior Publication Data

US 2007/0171050 A1    Jul. 26, 2007

(30) Foreign Application Priority Data

Jun. 27, 2005    (DE) .......................... 10 2005 030 031

(51) Int. Cl.
*H04L 29/06* (2006.01)
*H04L 9/32* (2006.01)
*G06F 11/30* (2006.01)
*G06F 15/167* (2006.01)
*G06F 15/173* (2006.01)
*G08B 23/00* (2006.01)

(52) U.S. Cl.
USPC ............. 713/153; 713/168; 713/188; 726/22; 709/216; 709/224

(58) Field of Classification Search
USPC ........... 713/153, 168, 188; 726/22; 709/216, 709/224
See application file for complete search history.

(56) References Cited

U.S. PATENT DOCUMENTS

| | | | |
|---|---|---|---|
| 6,880,089 B1 * | 4/2005 | Bommareddy et al. ........ | 726/11 |
| 2006/0085651 A1 * | 4/2006 | Staddon et al. ............... | 713/193 |
| 2006/0184377 A1 * | 8/2006 | Tan et al. .......................... | 705/1 |
| 2006/0245587 A1 * | 11/2006 | Pinkas et al. .................... | 380/28 |
| 2007/0053506 A1 * | 3/2007 | Takashima ..................... | 380/28 |
| 2007/0116283 A1 * | 5/2007 | Tuyls et al. .................. | 380/255 |

FOREIGN PATENT DOCUMENTS

| JP | 2002-108945 | 4/2002 |
|---|---|---|
| JP | 2002-218080 | 8/2002 |
| JP | 2004-185459 | 7/2004 |

OTHER PUBLICATIONS

Cam, H. et al., "Energy-Efficient and Secure Pattern-Based Data Aggregation for Wireless Sensor Networks", vol. 2, In: Sensors, 2003. Proceedings of IEEE, Oct. 22-24, 2003.
Ibrahim, I. et al., "A Semantic Solution for Data Integration in Mixed Sensor Networks", In: Special Issue "Wireless Sensor Networks and Applications" of Computer Communications, vol. 28, Elsevier B.V., available online Apr. 27, 2005.
JP Office Action dated May 18, 2011.

(Continued)

*Primary Examiner* — Aravind Moorthy
(74) *Attorney, Agent, or Firm* — Young & Thompson

(57) ABSTRACT

A method for managing data in a preferably non real-time sensor network, wherein the network comprises a multitude of sensor nodes to sense data, wherein the network is divided into clusters with each consisting of several sensor nodes, wherein within each cluster a sensor node acts as aggregator node to aggregate the sensed data of the rest of the sensor nodes of the cluster, and wherein always a pre-configurable number of neighbored clusters are combined to groups and the data aggregated within a cluster are stored by the aggregator node of the cluster itself and in addition by another aggregator node of a cluster of the respective group is characterized in that the data is encrypted with homomorphic methods before being stored persistently.

19 Claims, 4 Drawing Sheets

(56) References Cited

OTHER PUBLICATIONS

Heinzelman et al., "An Appliction-Specific Protocol Architecture for Wireless Microsnesor Networks," IEEE Transactions on Wireless Communications, vol. 1, No. 4, pp. 660-669 (2000).

Dimingo-Ferrer, "A Provably Secure Additive and Multiplicative Privacy Homomorphism," Universitat Rovira i Vigili, Dept. of Computer Engineering and Maths, Av. Paisos Catalans 26, E-43007 Tarragona, Catalonia, pp. 471-483, 2002.

Okamoto et al., "A New Public-Key Cryptosystem as Secure as Factoring," NTT Laboratories 1-1 Hikarinooka, Yokosuka-shi, 239-0847 Japan pp. 308-318, 1998.

Menezes et al., Handbook of Applied Cryptography, pp. 294-298, 1997.

* cited by examiner

METHOD FOR MANAGING DATA IN A WIRELESS SENSOR NETWORK

BACKGROUND OF THE INVENTION

1. Field of the Invention

The present invention relates to and in particular to a method for managing data in a preferably non real-time sensor network.

2. Description of the Related Art

Sensor networks show a constant growth in use and are in particular used in the areas of environment monitoring, for example, to analyze the evolution of the weather, distribution of humidity or water contaminations or in order to measure the temperature on surfaces, to analyze movement patterns, to control big industrial sites etc. The list of application possibilities could be continued almost endlessly.

In case of single sensors of a sensor network, they are wirelessly communicating sensor nodes, which in general consist of a probe, a processor unit, a communication device, as well as an energy source, for example, a battery or solar cells. The functionality of data acquisition, communication and processing are all gathered on a very dense space on the sensor node. This miniature design is extremely advantageous for specific applications, for example, the said environment monitoring, because they enable the deployment of the sensor nodes and consequently an application of the network also in areas that are hard to access.

Critical parameters, which circumstantially could restrict the application possibilities of sensor networks, are in particular given physical values of the individual sensor nodes, for example, their transmission range, processor power, battery capacity, available storage capacity and the like. Due to these physical restrictions, the energy-efficient organization of the sensor network is of particular importance.

In modern sensor networks of this described kind, it is already known to form clusters, wherein within one cluster a sensor node is assigned to be the aggregator node, at which the sensed data of the rest of the sensor nodes of the cluster are aggregated. The election of aggregator nodes can, for example, be performed according to pre-definable criteria, wherein it can be envisioned in particular to elect aggregator nodes depending on the energy resources that are still available for the respective sensor nodes. For this purpose, for example, the LEACH protocol (low energy adaptive clustering hierarchy) can be used together with a simple downstream routing protocol. The LEACH protocol is described in detail in W. B. Heinzelman, A. P. Chandrakasan, H. Balakrishnan, "An Application-Specific Protocol Architecture for Wireless Microsensor Networks", in IEEE Transactions on Wireless Communications, vol. 1, no. 4, pp. 660-670, October, 2002.

Regarding the request frequency of data sensed by individual sensor nodes and stored in the network, two different types of sensor networks can be distinguished: First, there are so-called non real-time sensor networks basically characterized in that the sensed data is continuously and under real-time requirements transmitted to a central authorized entity. Pre-requisite is a constant access of the entity to the network. If this access gets lost, the system is—until a potential repair—useless. In contrast, for specific applications it is not wanted or simply not possible to read out the sensed data under real-time requirements. Such networks are called non real-time sensor networks. With this kind of networks, the sensed data first has to be stored within the network, until it can be read out at certain temporal intervals by a reader (Reader R) authorized for doing so, for example in the form of a laptop.

With respect to the fact that in non real-time networks the authorized reader is not in constant contact to the network, there are several very serious problems regarding the data management in such networks. On the one hand, the restricted storage capacities and power resources of the individual sensor nodes need to be considered very carefully.

On the other hand, it has to be considered that not only individual sensor nodes can break down, for example, because their power resources have been consumed. Moreover, in non real-time networks it can happen under certain circumstances that after a long operation time without data request complete areas of the sensor network can break down, for example, due to external influences, which in the following will be generally referred to as "disaster". In extreme cases, such a disaster's consequence can result in that all the information that has been collected by sensor nodes within a disaster area, cannot be read out any more and is consequently lost.

It has already been considered to avert this danger by a certain redundancy when storing data, for example, by forming groups of several neighbored clusters. In this case, the data aggregated within a cluster of the group is stored by the aggregator node of the cluster itself and in addition by a further aggregator node of another cluster of the respective group. A problem with this approach is in particular the data security, because the data has to be stored persistently over a longer period, i.e. in case of a non real-time network at least over the time span between two query responses.

SUMMARY OF THE INVENTION

Hence, the present invention is based on the task to design a method for managing data in a preferably non real-time network of the above mentioned kind, which works as efficient as possible regarding the needed storage capacities and power resources, where the danger of loss of data due to break down/destruction of sensor nodes is reduced as much as possible, and which ensures in addition a high level of data security.

The method for managing data in a preferably non real-time sensor network as according to the invention solves the task mentioned above, wherein the network comprises a multitude of sensor nodes to sense data, wherein the network is divided into clusters with each consisting of several sensor nodes, wherein within each cluster a sensor node acts as aggregator node to aggregate the sensed data of the rest of the sensor nodes of the cluster, and wherein always a pre-configurable number of neighbored clusters are combined to groups and the data aggregated within a cluster is stored by the aggregator node of the cluster itself and in addition by further another aggregator node of a cluster of the respective group. According to this, such a method is characterized in that the data before being stored persistently, are encrypted by homomorphic methods.

According to the invention, it has first been recognized that—regarding the necessity of a persistent storage of sensed data over a possibly longer period of time between two queries—sensor networks can only be operated in a secure way, if not the data itself, but encrypted data is stored. According to the invention, an encryption of data by homomorphic methods is proposed. These methods provide a high level of data security on the one hand, that does almost not allow any non-authorized attacker to decrypt the data. On the other hand, these encryption methods do only require a relatively low additional computation effort, which has only an insignificant impact on the restricted resources, in particular on the power and storage capacity available to the sensor nodes. In spite of the data encryption, a redundancy when storing the data in order to ensure them against data loss is still possible.

Regarding an especially high level of data security, it can be provided that the homomorphic encryption methods are used in a nested way. This is particularly advantageous when using the sensor network in critical environments where the probability of an attack by an unauthorized attacker is increased.

Regarding a reasonable degree of structuring of the network, it can be provided that the aggregator nodes that store the data in addition, are selected by a network-uniform scheme. Such a network-wide uniform scheme is also advantageous with regard to the data query. In case a cluster has broken to a wide extent down due to a disaster, that cluster in which the interesting data is stored in a replicated way can also be identified by a network-wide uniform algorithm.

As aggregator node for the additional storage of data, for example, always the aggregator node of the cluster situated in clockwise direction in the neighborhood can be defined. Depending on the deployment of the sensor nodes and the structure of the cluster, any other scheme can be chosen as well.

Regarding a load on all sensor nodes that is as flat as possible, it proves to be advantageous to always perform the election of aggregator nodes again after a pre-configurable time. In the following, the period between two elections will be referred to as epoch. This division of the life span of the sensor network in individual epochs can, for example, be performed by the LEACH protocol described above.

In the context of a concrete embodiment, it is provided that all the sensor nodes encrypt their sensed and measured values $a_i$ encrypt by using a symmetric, additively homomorphic Privacy Homomorphism $PH_S$. For the encryption by $PH_S$, the encryption transformations E: $K \times Q \to R$ and the corresponding decrypting functions D: $K \times R \to Q$ are valid. With the measured values $a_1, a_2 \in Q$ and a symmetric key $k \in K$, an additively homomorphic $PH_s$ provides $$a_1 + a_2 = D_k(E_k(a_1) \oplus E_k(a_2)),$$

wherein "+" is an additive operation on elements of the clear text alphabet and "$\oplus$" is the corresponding additive operation on elements of the cipher-alphabet.

Currently available privacy homomorphisms of the category $PH_s$, as for example the PH suggested by Domingo-Ferrer (see J. Domingo-Ferrer, "A provably secure additive and multiplicative privacy homomorphism", in: *Information Security Conference* (ISC'02), Springer LNCS 2433, pp. 471-483, 2002), are insecure against selected cleartext attacks, but give a provable security against pure ciphertext attacks. In addition, the execution times that are needed for encryption, decryption and addition of encrypted data, can be performed without problems on computer platforms that are typically usable in sensor nodes. The size of the ciphertext exceeds the size of the corresponding cleartext by the factor n ($1 \leq n \leq 5$) as a maximum.

In a next step it can be provided that the aggregator nodes sum up the received encrypted values $s_i = E_k(a_i)$ and persistently store the resulting value $a_z$. By doing so, a data concealment not only when transmitting the data from the individual sensor nodes to the aggregator node, is secured, but also during the—possibly long-term—storage of data in the aggregator node.

In further subsequent steps it can be provided that the aggregator nodes add the stored value $a_z$ of their own cluster $Q_z$ to the additionally stored value $a_{z-1}$ of a cluster $Q_{z-1}$ of the same group and encrypt the sum by using an asymmetric, additively homomorphic privacy homomorphism $PH_a$. For privacy homomorphisms of the category $PH_a$, the encryption transformations E: $K_p \times Q \to R$ and the corresponding decryption functions D: $K_q \times R \to Q$ apply, wherein $(p,q) \in (K_p, K_q)$ is a public/private key-pair. With $a_1, a_2 \in Q$, the homomorphism provides $$a_1 + a_2 = D_q(E_p(a_1) \diamond E_p(a_2)),$$

wherein the operation "$\diamond$" represents the additive operation on elements of the cipher alphabet.

A specific encryption method of the category $PH_a$ is the encryption transformation according to Okamoto and Uchiyama (refer to T. Okamoto, S. Uchiyama, "A new Public-Key Cryptosystem as Secure as Factoring", in *Advances in Cryptology-EUROCRYPT'98*, pp. 303-318, 1998). In contrast to the abovementioned symmetric privacy homomorphisms, this scheme provides a high level of security comparable to the security that can be achieved by factorization. But the minimum size of the ciphertext for all cleartexts with $|a|=1024$ bit is always $|E_k(a)|=1024$ bit, which has negative impacts on the need for power required for data transfer. It is an advantage though, that the addition operation on the encrypted data can be neglected regarding the power consumption.

Another apt candidate for a $PH_a$ is the ElGamal public key encryption on elliptic curve points (refer to A. J. Menezes, P. C. van Oorshot, S. A. Vanstone, Handbook of Applied Cryptography, The CRC Press Series on Discrete Mathematics and its Applications, 1997). The ElGamal encryption method is based on the discrete logarithm problem.

Such a choice reduces the size of the ciphertext to the double length of the key size. A significant advantage of this method is the fact that the ciphertext—also in case of a high level of security—can be transmitted in a single packet standardized according to IEEE 802.15.4.

Due to the encrypted storage as proposed, an advantageous redundancy is created not only with regard to possible breakdowns of network areas, but the redundant data is in addition stored with reasonable power consumption at a high level of security. In other words, regarding the data concealment, there is a high level of security even in case of a necessity of a longer-lasting storage (between two read-out requests by a reader), also in public or non-reliable environments.

In an especially advantageous way, the formation of groups and, consequently, the data aggregation and data storage can be performed on several levels of a hierarchy. This is especially beneficial in case of larger networks which, for example, comprise thousands of sensor nodes, in order to avoid an exaggerate growth in size of the individual clusters.

The network senses and stores environmental data in an advantageous way continuously as function over the time and the region. After a certain period of time the network hence comprises a detailed "representative data" of the sensed environment. The granularity of this representative data can be influenced in respect of the region, in particular by the chosen cluster formation. Regarding the temporal granularity, for example, a daily, weekly, monthly etc read out of data can be provided, which could be synchronized in an advantageous way with the period of time of the epochs.

In a further advantageous way, the data request could be adjusted to the distributed two-dimensional data base structure within the network, i.e. in other words, a data request of a reader—for example a laptop—addressing the network could comprise the time and the region of the requested data.

When an aggregator node receives a data request, the value which is encrypted by $PH_a$ in an advantageous way—for example $E_p(a_z \oplus a_{z-1})$ in case of a request addressing the cluster $Q_z$—is sent to the reader. Depending on the sending distance of the aggregator nodes and the spatial structure of the network, the aggregator nodes can send their responses to the reader either directly or as multi-hop over sensor nodes acting as forwarding nodes. Due to the encryption by using an asymmetric privacy homomorphism, an attacker is not capable of acquiring the data when the data are transmitted, even if he knows the public key p, because the private key q necessary for decryption is only known to the reader. The reader, though, usually acts in a protected environment that is not exposed to any external attacks.

Regarding a reconstruction as complete as possible of sensed data from disaster regions of the network, it is proven to be especially advantageous to distinguish in case of data requests addressed to the network between continuous queries and exceptional queries. In order to do so, the message concerned could, for example, either be flagged or not flagged.

In case there was no disaster, i.e. breakdowns of sensor nodes took mainly place in an evenly distributed manner over the sensor network only (for example due to complete power consumption), continuous queries are addressed to the network. Here, it can be provided that these data queries are only forwarded to those clusters that dispose of the requested information due to the fact that they belong to the region given in the data query.

In contrast, exceptional data queries are addressed to the network if a disaster has taken place, i.e. for example a multitude of sensor nodes has broken down locally due to an external impact. In this case, it can be provided that such exceptional data queries are only forwarded to the respective complementary clusters of a group. From the responses sent to the reader by the complementary clusters, the requested information can be reconstructed by means of decryption and appropriate addition and/or subtraction of the decrypted values.

Now, there are several options of how to design and to further develop the teaching of the present invention in an advantageous way. For this purpose, it must be referred to the following explanation of a preferred example of an embodiment of the invention together with the figure on the other hand. In connection with the explanation of the preferred example of an embodiment and the figure, generally preferred designs and further developments of the teaching will also be explained.

DESCRIPTION OF THE PREFERRED EMBODIMENTS

Figure 1:
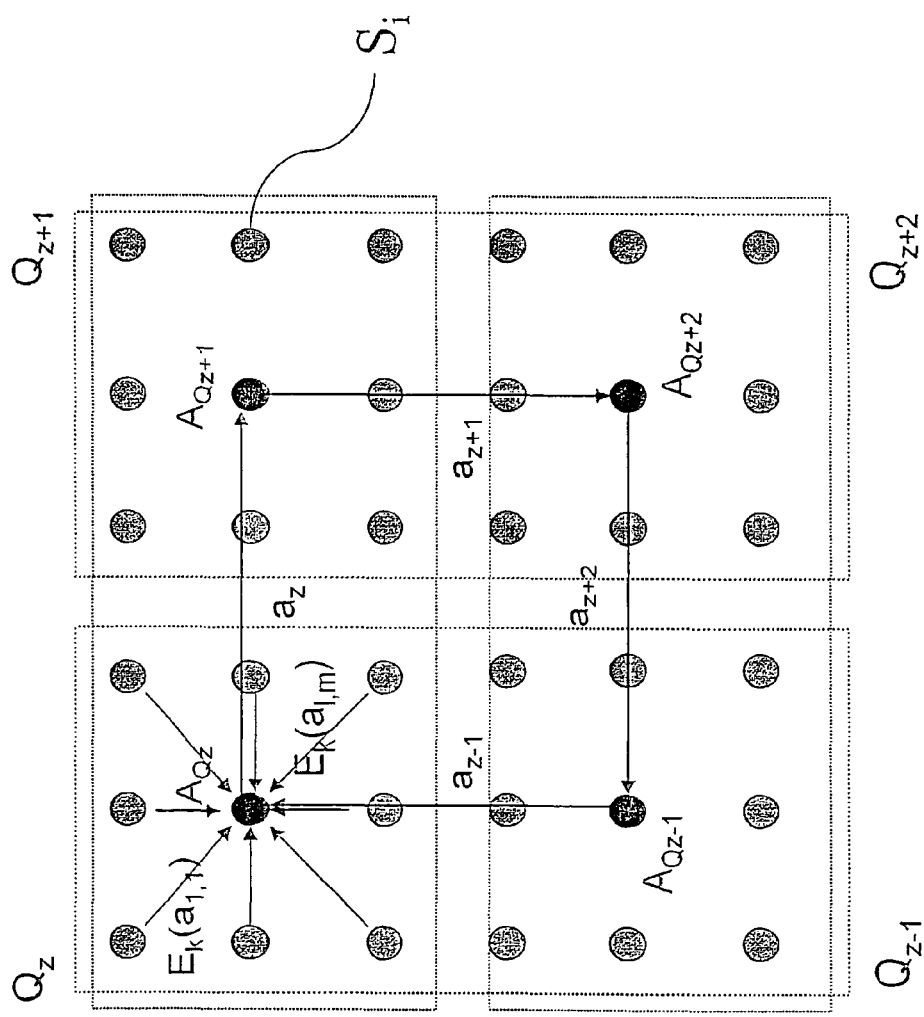
FIG. 1 is a diagram showing a schematic depiction of a group of a sensor network consisting of four clusters.

FIG. 1 shows—schematically—a part of a sensor network with a multitude of sensor nodes $S_i$. After deployment of the sensor nodes $S_i$ in an area to be monitored, clusters Q have been formed by means of the LEACH protocol, wherein in FIG. 1 a total of clusters $Q_{z-1}$, $Q_z$, $Q_{z+1}$ and $Q_{z+2}$ is depicted. Within each cluster, one of the sensor nodes $S_i$ has been elected—also by means of the LEACH protocol—as aggregator node $A_Q$. The election of an aggregator node $A_Q$ within a cluster Q is always repeated anew after a pre-configurable period of time, i.e. an epoch. As it is clearly evident from FIG. 1, every cluster Q has all in all 9 sensor nodes $S_i$, wherein the sensor node acting as aggregator node $A_Q$ is depicted as dark dot. The four clusters Q being neighbors to each other, are—according to the invention—arranged in a group. According to the invention, the arrows represent the data flow within the group. In every epoch the sensor nodes $S_i$ encrypt their sensed measured values $a_i$ by a symmetric, additively homomorphic privacy homomorphism $PH_S$ and send the encrypted values $s=E_k(a_i)$ to the aggregator node $A_Q$ chosen for the epoch of their cluster Q. The aggregator nodes $A_Q$ add the received encrypted values s and store the consequently resulting value $a_z$ (for cluster $Q_z$) persistently. In addition, every aggregator node $A_Q$ sends the stored value to the aggregator node $A_Q$ which is the neighbor cluster Q of its group in clockwise direction, where the value is also stored persistently. To give a concrete example, the aggregator node $A_{Qz}$ of cluster $Q_z$ stores the value $a_z$ of its own cluster $Q_z$ and in addition the value $a_{z-1}$ of the cluster $Q_{z-1}$ neighboring cluster $Q_z$ in clockwise direction.

Figure 2:
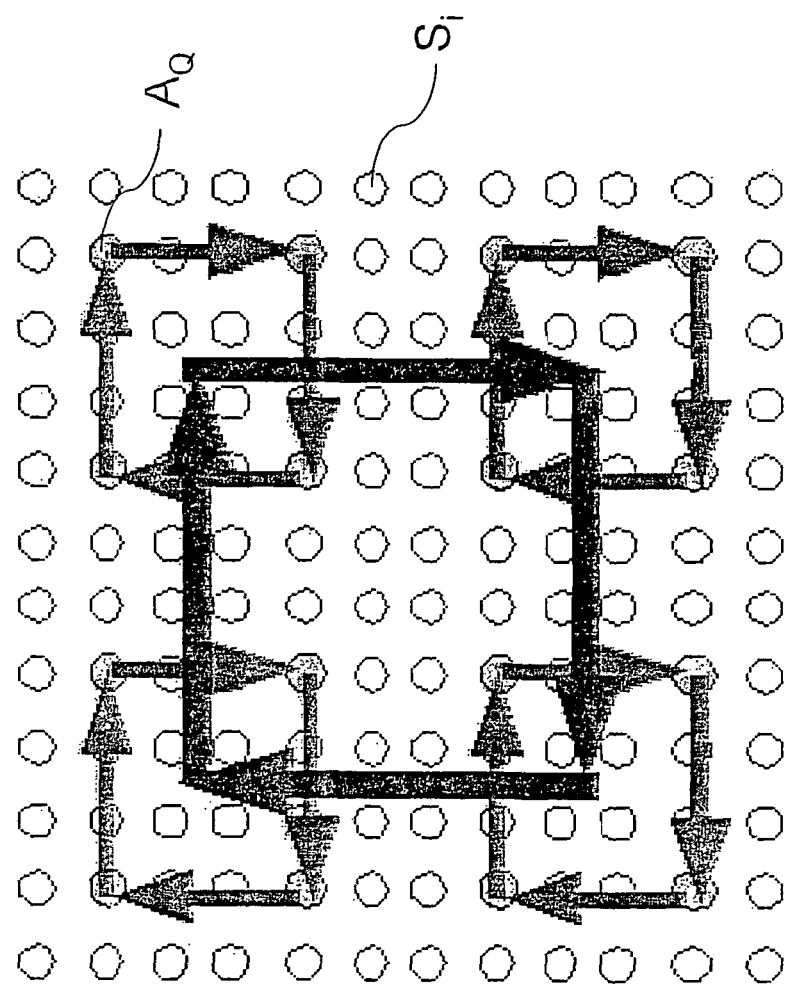
FIG. 2 is a diagram showing a schematic depiction of a hierarchical group formation within a sensor network.

FIG. 2 shows the application of the method according to the invention on two hierarchy levels. Concretely, four groups of the kind depicted in FIG. 1 are combined to a superordinated group. The data flow follows on a superordinated hierarchy level the same method as described in the context with FIG. 1.

Figure 3:
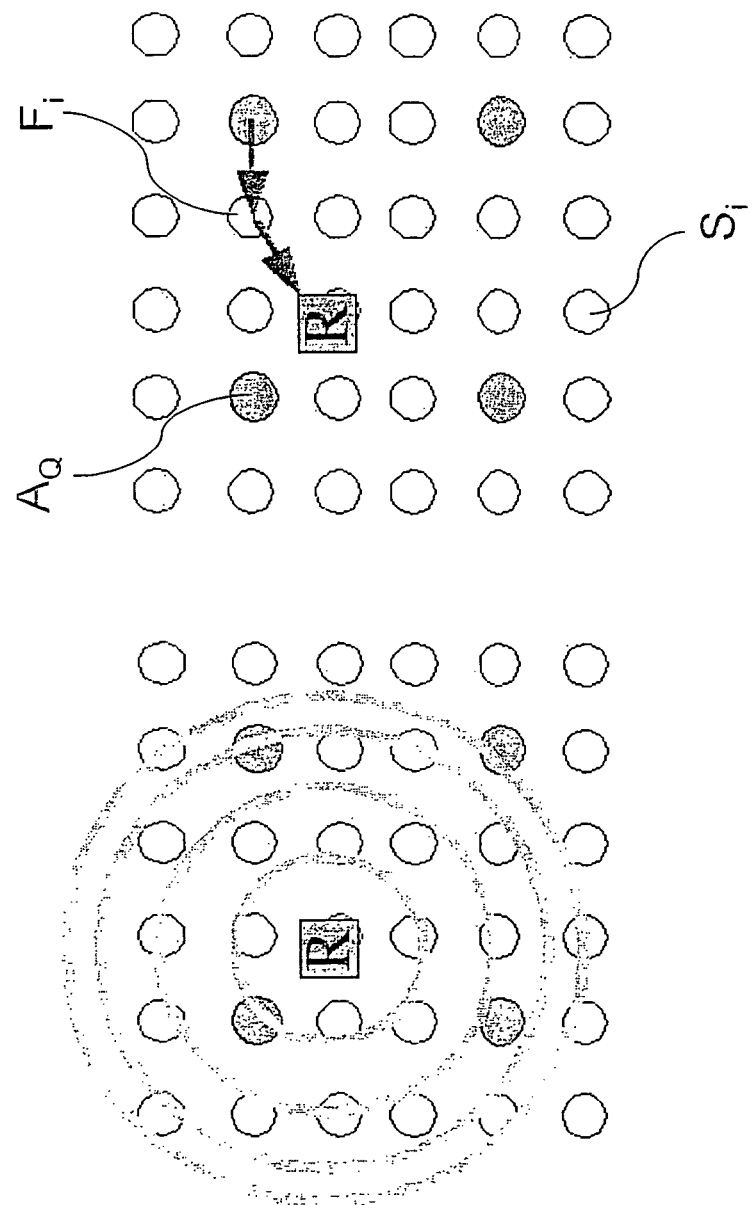
FIG. 3 is a diagram showing a schematic depiction of a continuous data query.

FIG. 3 shows—schematically—the process of continuous data query as well as a corresponding response scheme. At an arbitrary point in time, the reader R, for example a laptop has come near to the network in order to request specific data. For this purpose, the reader R sends out a radio signal that comprises the moment in time, i.e. concretely the epoch in which the requested data was sensed, as well as the region where the data was sensed. Since every sensor node $S_i$ knows to which cluster Q it belongs to, it is possible to forward the request only to those clusters Q whose aggregator nodes $A_Q$ possess the relevant information. Depending on the transmission distance of the aggregator nodes $A_Q$, or the distance between the aggregator nodes $A_Q$ and reader R, respectively, the aggregator node $A_Q$ sends the relevant data—encrypted—either directly or—as depicted in the right part of FIG. 3—multi-hop over sensor node $S_i$ acting as forwarding node $F_i$.

Figure 4:
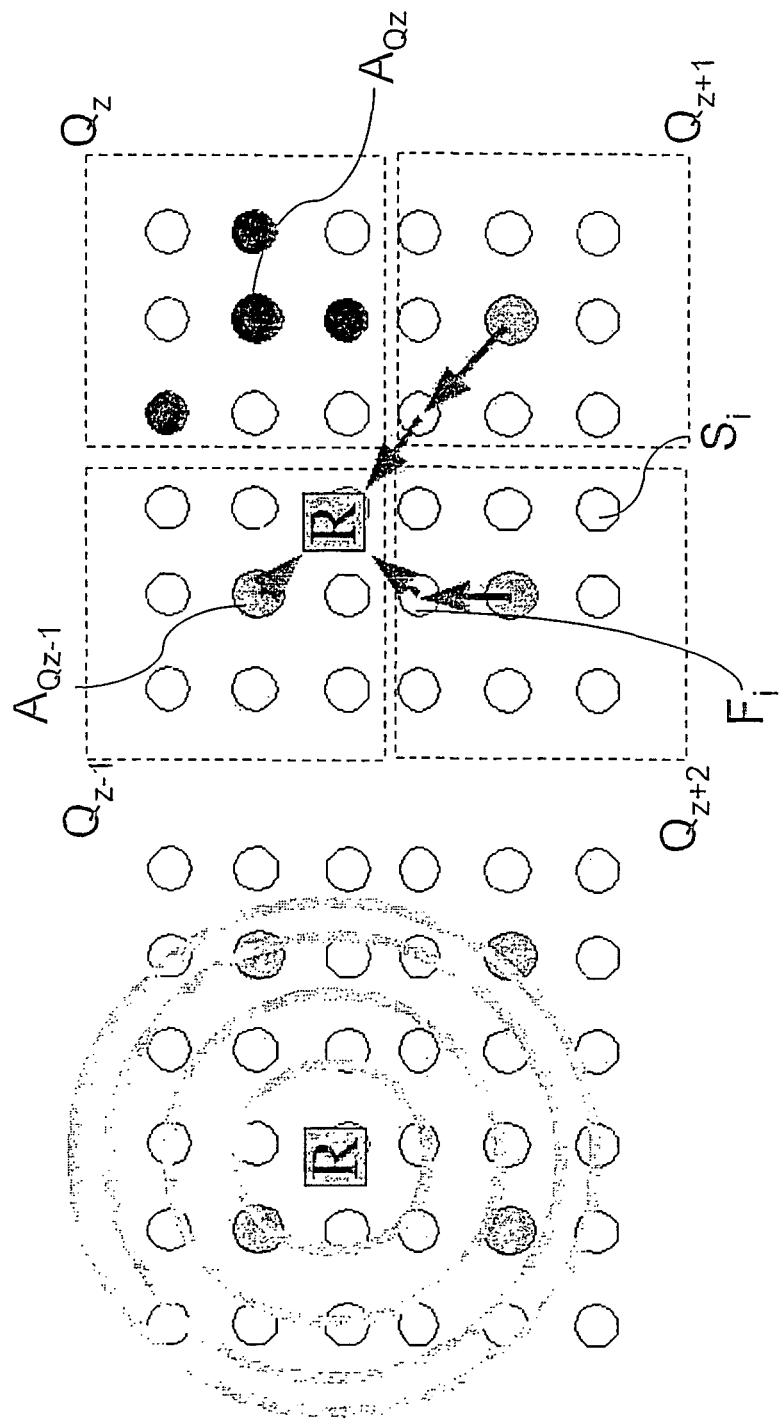
FIG. 4 is a diagram showing a schematic depiction of an exceptional data query.

FIG. 4 shows the case of exceptional data query. In the target area of interest, a multitude of sensor nodes $S_i$ (depicted in dark colour) have been disabled due to external influences ("disaster"). It is assumed the failure is known to the reader R. The disabled sensor nodes $S_i$ are located within cluster $Q_z$. Since also the aggregator node $A_{Qz}$ of cluster $Q_z$ is impacted, from cluster $Q_z$ no data can be retrieved directly any more. Due to the redundant data storage, according to the invention, a reconstruction of the data of interest is possible.

In FIG. 4 a special case is depicted, where four clusters are combined to a group. A data request addressed to the clusters $Q_z$ and $Q_{z-1}$ jointly is processed as follows: The clusters $Q_{z-1}$, $Q_{z+1}$ and $Q_{z+2}$ send each $A_{Qz-1} \rightarrow R$: $E_p(a_{z-1} \oplus a_{z+2})$, $A_{Qz+1} \rightarrow R$: $E_p(a_{z+1} \oplus a_z)$, $A_{Qz+2} \rightarrow R$: $E_p(a_{z+2} \oplus a_{z+1})$ to the reader R. Then, R applies the private key q for decryption. After that, R adds the stored data of the directly neighbored clusters $Q_{z-1}$ and $Q_{z+1}$ of the disabled cluster $Q_z$ and subtracts the value of the opposite cluster $Q_{z+2}$, i.e.

$$D_q(a_{z-1} \oplus a_{z+2}) + D_q(a_{z+1} \oplus a_z) - D_q(a_{z+2} \oplus a_{z+1}) = D_q(a_z \oplus a_{z-1}).$$

The consequently achieved result is the requested representative data from the region $Q_z \cup Q_{z-1}$ which had been stored in the destroyed cluster $Q_z$. If the reader R is only interested in the cluster $Q_z$, it can be subtracted from the value $D_k(a_{z-1})$ achieved from above, i.e.:

$$D_q(a_z \oplus a_{z-1}) - D_q(a_{z-1}).$$

Regarding further advantageous embodiments of the teaching according to the invention and in order to avoid repetitions, reference is made to the general part of the description as well as to the attached claims.

Finally, it is particularly important to point out that the example of an embodiment of the teaching according to the invention described above only serve as illustration of the teaching according to the invention, but that it does by no means restrict the latter to the given examples of an embodiment.

The invention claimed is:

1. A method for managing data in a non real-time sensor network, said method comprising the steps of:
   operating in a network that comprises a multitude of sensor nodes comprised of sensors to sense data, wherein the network is divided into clusters with each cluster including plural sensor nodes,
   within each cluster, operating one sensor node to act as an aggregator node to aggregate the sensed data of the rest of the sensor nodes of that cluster, and
   combining a pre-configurable number of neighbored clusters into groups; and
   persistently storing the data, aggregated within each cluster by the aggregator node of that cluster, in i) the aggregator node of that cluster and ii) in another aggregator node of another cluster of the respective group to provide additional storage, wherein the data is encrypted with homomorphic methods before being persistently stored,
   wherein the sensors are environment monitoring sensors suitable to measure humidity, water contaminations, and surface temperature.

2. The method according to claim 1, wherein the encrypting step comprises applying the homomorphic encryption methods in a nested way.

3. The method according to claim 1, wherein the aggregator nodes that provide the additional storage of data are determined by a scheme which is uniform for the whole network.

4. The method according to claim 3, comprising the step of always defining the aggregator node of the cluster neighbored in clockwise direction as the aggregator node to provide the additional storage of data.

5. The method according to claim 1, wherein after a pre-configurable period of time, referred to as an epoch, a new election of aggregator nodes is performed.

6. The method according to claim 5, wherein during each epoch all sensor nodes encrypt their sensed measured value $a_i$ by applying a symmetric, additively homomorphic privacy homomorphism $PH_s$, and send the encrypted value $s_i = E_k(a_i)$ to the aggregator node of their cluster.

7. The method according to claim 6, wherein the aggregator nodes add up the received encrypted values $s_i$ and persistently store the resulting value $a_z$.

8. The method according to claim 7, wherein the aggregator nodes add up the stored value $a_z$ of their own cluster and the additionally stored value $a_{z-1}$ of a cluster of the same group, that they encrypt the sum by applying an asymmetric, additively homomorphic privacy homomorphism $PH_a$, and also store the consequently resulting value $E_p(a_z \oplus a_{z-1})$ persistently.

9. The method according to claim 1, wherein the group formation and, accordingly, the data aggregation and data storage are performed on several levels of a hierarchy.

10. The method according to claim 1, wherein the sensed data is stored in a two-dimensional data base depending on time and region of data acquisition.

11. The method according to claim 1, wherein a reader indicates time and a region in the context of a data request addressed to the network.

12. The method according to claim 11, wherein the aggregator nodes send each value $E_p(a_z \oplus a_{z-1})$ encrypted by $PH_a$ to the reader.

13. The method according to claim 12, wherein the aggregator nodes send their responses directly or multi-hop over sensor nodes acting as forwarding nodes to the reader.

14. The method according to claim 11, wherein in case of data queries addressed to the network, continuous queries and exceptional queries are distinguished.

15. The method according to claim 14, wherein the continuous data queries are only forwarded to those clusters that dispose of the requested information due to the fact that they belong to the region indicated in the data query.

16. The method according to claim 14, wherein the exceptional data queries are only forwarded to the corresponding complementary clusters of the respective group.

17. The method according to claim 16, wherein from the information achieved in the context of an exceptional data query, the requested information is reconstructed by decryption and appropriate addition and/or subtraction of the decrypted values.

18. The method of claim 1, wherein the network is a non real-time sensor network.

19. The method of claim 1, wherein the sensors each comprise a measurement probe, a processor unit, a communication device, and an energy source.

* * * * *